(12) United States Patent
England et al.

(10) Patent No.: US 7,197,062 B2
(45) Date of Patent: Mar. 27, 2007

(54) METHOD AND APPARATUS TO DETECT AND DECODE INFORMATION

(75) Inventors: David G. England, Chandler, AZ (US); Evan R. Green, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 336 days.

(21) Appl. No.: 10/263,363

(22) Filed: Oct. 1, 2002

(65) Prior Publication Data

US 2004/0062325 A1 Apr. 1, 2004

(51) Int. Cl.
*H04B 1/69* (2006.01)

(52) U.S. Cl. ....................................... 375/130

(58) Field of Classification Search ................. 341/122, 341/123, 124, 125; 375/340, 376
See application file for complete search history.

(56) References Cited

U.S. PATENT DOCUMENTS

| | | | | |
|---|---|---|---|---|
| 4,005,423 A * | 1/1977 | Webb | .................. | 343/17.2 PC |
| 4,390,838 A * | 6/1983 | Savage | ..................... | 324/77 E |
| 4,532,515 A * | 7/1985 | Cantrell et al. | ........... | 343/16 R |
| 4,587,415 A * | 5/1986 | Tsunekawa et al. | ......... | 250/204 |
| 4,611,194 A * | 9/1986 | Konig et al. | .......... | 341/347 SH |
| 4,629,424 A * | 12/1986 | Lauks et al. | .................... | 433/6 |
| 4,761,796 A * | 8/1988 | Dunn et al. | ..................... | 375/1 |
| 4,893,317 A * | 1/1990 | Critchlow et al. | ............. | 375/97 |
| 4,953,183 A * | 8/1990 | Bergmans et al. | .......... | 375/101 |
| 4,994,802 A * | 2/1991 | Critchlow et al. | .......... | 341/122 |
| 5,367,301 A * | 11/1994 | Stiltner et al. | .............. | 341/144 |
| 5,418,533 A * | 5/1995 | Knierim | ....................... | 341/122 |
| 5,486,833 A * | 1/1996 | Barrett | ....................... | 342/204 |
| 5,592,164 A * | 1/1997 | Hilbert et al. | .............. | 341/120 |
| 5,640,698 A * | 6/1997 | Shen et al. | .................. | 455/323 |
| 5,677,927 A | 10/1997 | Fullerton et al. | | |
| 5,694,466 A * | 12/1997 | Xie et al. | .................... | 379/386 |
| 5,790,613 A * | 8/1998 | Tateishi | ....................... | 375/376 |
| 6,018,364 A * | 1/2000 | Mangelsdorf | ............... | 348/241 |
| 6,104,200 A * | 8/2000 | Hook | ......................... | 324/643 |
| 6,351,652 B1 | 2/2002 | Finn et al. | | |
| 6,421,389 B1 * | 7/2002 | Jett et al. | ..................... | 375/256 |
| 6,473,014 B2 * | 10/2002 | Banu et al. | ................. | 341/122 |
| 6,483,448 B2 * | 11/2002 | Martin et al. | ............... | 341/123 |
| 6,510,313 B1 * | 1/2003 | Rapeli | ........................ | 455/323 |

(Continued)

FOREIGN PATENT DOCUMENTS

EP    1 298 811 A1    4/2003

(Continued)

OTHER PUBLICATIONS

Wu et al., "A S/H Interpolator for Oversampling D/A Converters", IEEE 1992 International Symposium on Circuits and Systems, ISCAS '92 Proceedings, May 3-6, 1992, vol. 2, pp. 613-616.*

(Continued)

*Primary Examiner*—Don N. Vo
(74) *Attorney, Agent, or Firm*—Rita M. Wisor (57) ABSTRACT

Briefly, in accordance with an embodiment of the invention, a method and apparatus to detect and decode information is provided, wherein the method includes sampling a radio frequency (RF) impulse signal to generate a sample signal and storing the sample signal for a predetermined amount of time.

17 Claims, 6 Drawing Sheets

U.S. PATENT DOCUMENTS

| | | | |
|---|---|---|---|
| 6,529,568 B1 * | 3/2003 | Richards et al. | 375/346 |
| 6,608,875 B1 * | 8/2003 | Wolaver | 375/375 |
| 6,678,313 B1 * | 1/2004 | Imaizumi et al. | 375/150 |
| 6,690,741 B1 * | 2/2004 | Larrick et al. | 375/295 |
| 6,891,809 B1 * | 5/2005 | Ciccone et al. | 370/289 |
| 2002/0034191 A1 | 3/2002 | Shattil | |
| 2002/0061080 A1 * | 5/2002 | Richards et al. | 375/346 |
| 2002/0168003 A1 | 11/2002 | Richards | |
| 2003/0214978 A1 * | 11/2003 | Bois et al. | 370/529 |
| 2003/0232612 A1 * | 12/2003 | Richards et al. | 455/323 |
| 2004/0203697 A1 * | 10/2004 | Finn | 455/420 |
| 2005/0259549 A1 * | 11/2005 | Yokoi | 369/59.11 |

FOREIGN PATENT DOCUMENTS

| | | |
|---|---|---|
| EP | 1 298 812 A1 | 4/2003 |
| WO | WO 02/32008 A2 | 4/2002 |

OTHER PUBLICATIONS

Moe Z. Win et al., "Ultra-Wide Bandwidth Time-Hopping Spread-Spectrum Impulse Radio for Wireless Multiple-Access Communications", 2000 IEEE, IEEE Transaction on Communications, vol. 48, No. 4, Apr. 2000, pp. 679-691.

* cited by examiner

METHOD AND APPARATUS TO DETECT AND DECODE INFORMATION

BACKGROUND

Today's wireless communication systems may employ many different types of apparatuses and methods to wirelessly receive, decode, and detect information. Many techniques and architectures exist to receive, detect and decode received information. Factors such as cost and power consumption may be considered when designing a particular system.

Thus, there is a continuing need for alternate ways to detect and decode information.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

Embodiments of the present invention may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, electromechanical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions and data.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
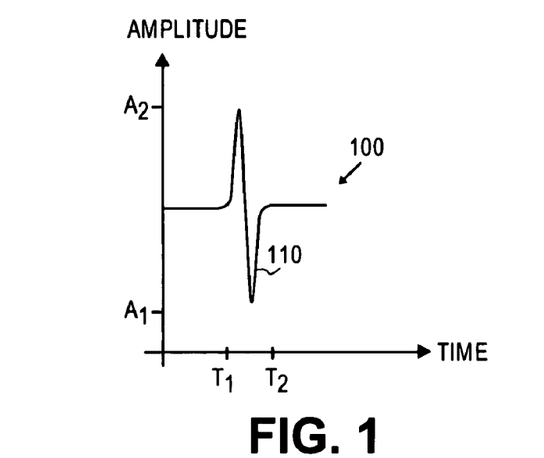
FIG. 1 is a diagram illustrating a waveform in the time domain.

Turning to FIG. 1, a diagram illustrating a waveform 100 in the time domain is illustrated. TIME is denoted along the x-axis and AMPLITUDE is denoted along the y-axis.

In this diagram, waveform 100 may be referred to as a Gaussian monocycle signal 110. That is, waveform 100 includes a single-cycle, sinusoidal signal and may be referred to simply as a monocycle signal. Monocycle signal 110 may also be generally referred to as an impulse, a pulsed signal, a pulse signal, a wideband radio frequency (RF) signal, a RF impulse signal, a RF pulse signal, a pulsed RF signal, or an ultrawideband (UWB) signal. More specifically, monocycle signal 110 may be referred to as a monocycle pulse or a monopulse signal. Various other terms may also be used to refer to monocycle signal 110. Monocycle signal 110 has a pulse width or duration of $6T_2-T_1$ and a maximum amplitude of $A_2$ and a minimum amplitude of $A_1$.

Figure 2:
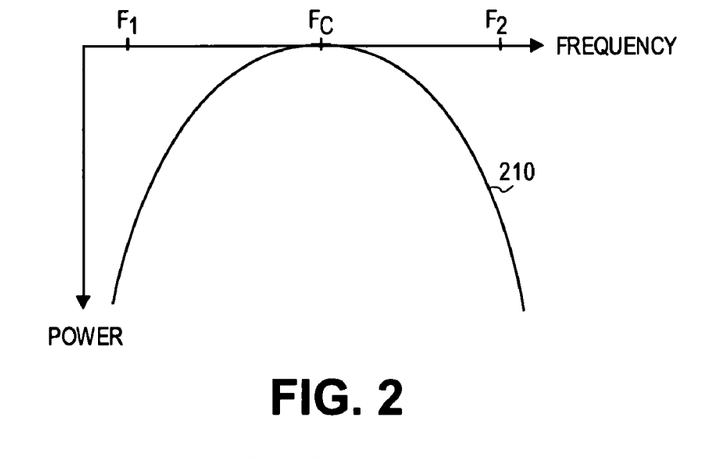
FIG. 2 is a diagram illustrating the waveform of FIG. 1 in the frequency domain.

Turning to FIG. 2, a diagram of the waveform of FIG. 1 in the frequency domain is illustrated (referred to as signal 210). The center frequency (labeled Fc) and the bandwidth ($F_2-F_1$) of signal 210 may be dependent upon the duration of monocycle signal 110. In some embodiments, the center frequency of a monocycle signal may be approximately equal to the reciprocal of its duration and the bandwidth may be approximately 160% of the center frequency. For example, if monocycle signal 110 has a duration of about 0.5 nanoseconds (ns) in the time domain, then the center frequency of monocycle signal 110 in the frequency domain may be about 2.0 gigahertz (GHz) and the bandwidth of monocycle signal 110 in the frequency domain may be about 3.2 GHz, although the scope of the present invention is not limited in this respect.

A wireless communication system may transfer one or more bits of information using monocycle signal 110. Or alternatively, a system may use a pulse train, which includes multiple monocycle signals, to transfer one bit of information.

It should be noted that herein that the terms data and information may be used interchangeably. In addition, the terms information and data may refer to a single bit of information or may refer to more than one bit of information.

It should be noted that an ideal Gaussian monocycle signal 110 is illustrated in FIG. 1. However, in practice, rather than using an ideal Gaussian monocycle signal to transfer information, a non-ideal monocycle signal (not shown) may be used to transfer information in a communication system. In the frequency domain, a non-ideal monocycle signal may have a reduced bandwidth compared to an ideal monocycle signal.

Figure 3:
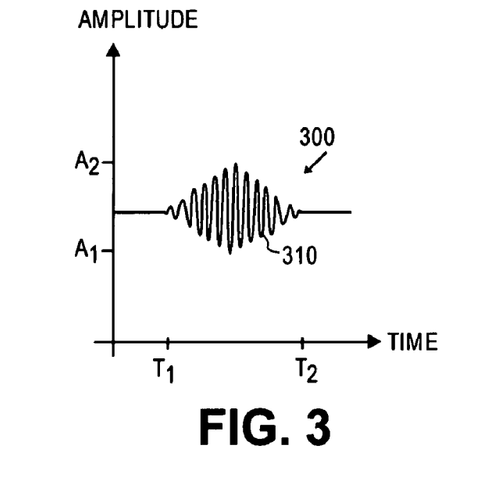
FIG. 3 is a diagram illustrating a waveform in the time domain.

Turning to FIG. 3, a diagram illustrating a waveform 300 in the time domain is illustrated. TIME is denoted along the x-axis and AMPLITUDE is denoted along the y-axis.

Waveform 300 may be referred to as a multicycle signal 310. That is, multicycle signal 310 is a multiple cycle sinusoidal signal and may be a time-limited segment of an underlying sinusoid that includes several (e.g., two or more) cycles of the sinusoid. In some embodiments, a multicycle signal may be several cycles of a sine wave with an envelope. Although the scope of the present invention is not limited in this respect, multicycle signal 310 may be damped at the beginning and at the end of the segment, creating a shaped envelope for multicycle signal 310 as shown in FIG. 3. Multicycle signal 310 may be generated by a sustained burst of energy at a single frequency. A multicycle signal may refer to a pulse that consists of a burst of cycles, whereas a monocycle signal may refer to a pulse having less than two cycles. Multicycle signal 310 has a pulse width or duration of $T_2-T_1$ and a maximum amplitude of $A_2$ and a minimum amplitude of $A_1$.

Multicycle signal 310 may be generally referred to as an impulse, a pulsed signal, a pulse signal, a wideband radio frequency (RF) signal, a RF impulse signal, a RF pulse signal, a pulsed RF signal, or an ultrawideband (UWB) signal. More specifically, multicycle signal 310 may be referred to as a non-monocycle signal, a burst signal, a tone signal, a tone-burst signal, a multipulse signal, or a subband pulse signal. Various other terms may also be used to refer to multicycle signal 310.

Figure 4:
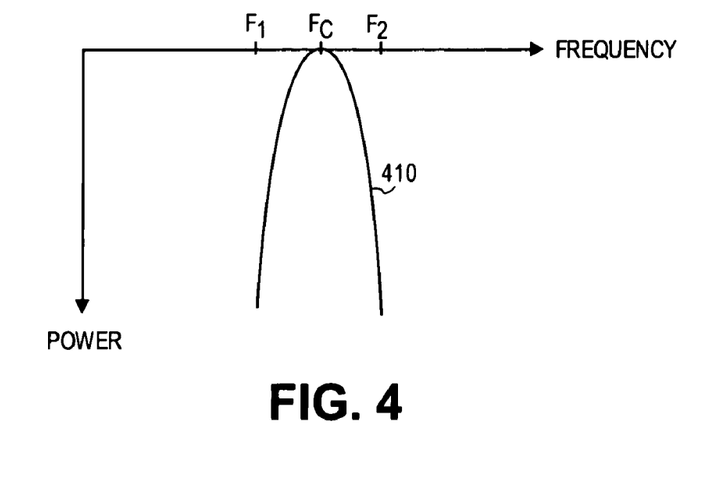
FIG. 4 is a diagram illustrating the waveform of FIG. 3 in the frequency domain.

Turning to FIG. 4, a diagram of the waveform of FIG. 3 in the frequency domain is illustrated (referred to as signal 410). The center frequency (labeled Fc) and the bandwidth ($F_2-F_1$) of signal 410 may be dependent upon the duration of multicycle signal 310. In some embodiments, the center frequency of a monocycle signal may be approximately equal to the reciprocal of its duration and the bandwidth may be approximately 160% of the center frequency. For example, if multicycle signal 410 has a duration of about 2 nanoseconds (ns) in the time domain, then the center frequency of monocycle signal 110 in the frequency domain may be about 500 megahertz (MHz) and the bandwidth of monocycle signal 110 in the frequency domain may be about 800 MHz, although the scope of the present invention is not limited in this respect.

Although the same amplitude, time, and frequency designations (e.g., $T_1$, $T_2$, $A_1$, $A_2$, $F_1$, $F_2$, $F_c$) are used in FIGS. 1–4, these designations may correspond to different times, amplitudes, and frequencies. Waveforms 100 and 300 may be referred to as RF signals having a bandwidth of at least about 500 MHz A wireless communication system may transfer one or more bits of information using multicycle signal 310. Or alternatively, a system may use a pulse train, which includes multiple multicycle signals, to transfer one bit of information. Wireless communication systems that transfer information using waveform 100 (FIG. 1) or waveform 300 (FIG. 3) may be referred to as ultrawideband (UWB) systems. Various other terms may be used to refer to transmission systems using waveforms 100 and 300. For example, a communication system using waveforms 100 and 300 may be referred to as a carrierless, baseband, impulse radio (IR), or impulse-based system.

Information may be communicated or transferred between two devices by modulating multicycle signal 310 or monocycle signal 110. By varying the amplitude, polarity, timing or other characteristic of monocycle signal 110, information may be coded using monocycle signal 110. One timing modulation scheme, which may be referred to as time shifting or pulse position modulation, may include moving the position of the pulse in time relative to a nominal position. Similarly, varying the amplitude, polarity, timing or other characteristic of multicycle signal 310 may be used to modulate multicycle signal 310.

Figure 5:
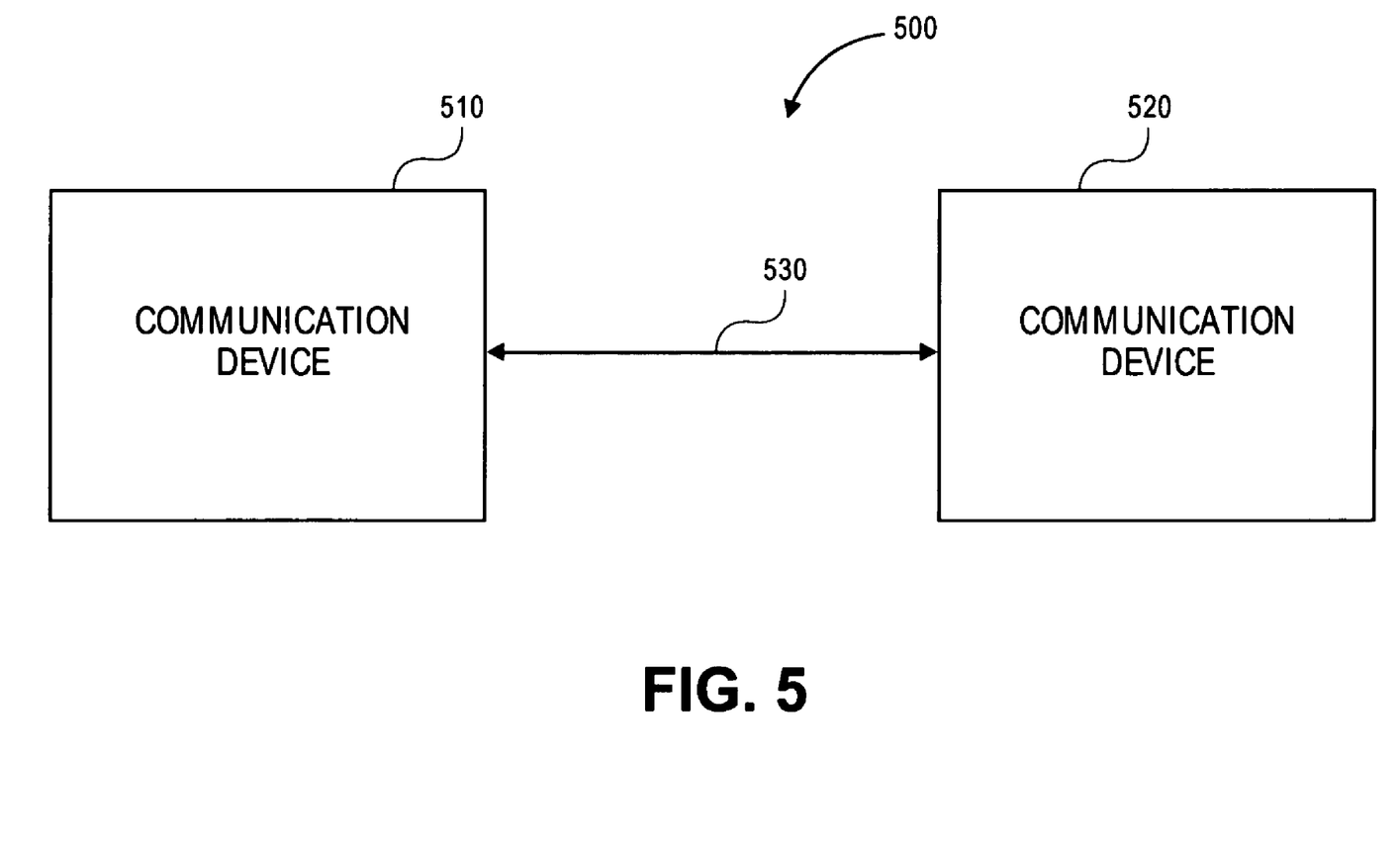
FIG. 5 is a simplified block diagram illustrating a portion of a communication system in which embodiments of the present invention may be practiced.

Turning to FIG. 5, a simplified block diagram of a portion of a communication system 500 is illustrated. System 500 may be a wireless system, and information may be transferred between communication devices 510 and 520 via a bi-directional communication link 530. Communication devices 510 and 520 may be wireless devices and communication link 530 may be an air interface and may represent one or more communication channels or paths between devices 510 and 520. Communication devices 510 and 520 may include wireless transceivers (not shown) and antennas (not shown) to transfer information using radio frequency (RF) signals. Communication devices 510 and 520 may be access points (AP), personal digital assistants (PDAs), laptop and portable computers with wireless capability, web tablets, wireless telephones, wireless headsets, pagers, instant messaging devices, digital music players, digital cameras, or other devices that may be adapted to transmit and/or receive information wirelessly.

Devices 510 and 520 may be adapted to process a UWB waveform such as, for example, waveform 100 or waveform 300 discussed above with reference to FIGS. 1–4. In some embodiments, a UWB waveform may refer to an RF signal having a bandwidth of more than about 25% of its center frequency In other embodiments, a UWB waveform may refer to an RF signal having a bandwidth of at least about 500 MHz. In one embodiment, devices 510 and 520 may include a waveform generator (not shown) capable of generating, for example, waveform 100 or waveform 300 to transfer information between device 510 and device 520. In addition, devices 510 and 520 may include detector and decode circuitry (not shown) adapted to receive and recover transmitted information. Generally, devices 510 and 520 may be adapted to process wideband RF signals having bandwidths ranging between about 500 MHz to about 20 GHz. In some embodiments, devices 510 and 520 may be part of a wireless local area network (WLAN) and adapted to communicate or transfer information using wideband RF signals at distances of less than about 100 meters (m), although the scope of the present invention is not limited in this respect. In other embodiments, devices 510 and 520 may be part of a wireless personal area network (WPAN) and adapted to communicate information using wideband RF signals at distances of less than about 10 meters.

Figure 6:
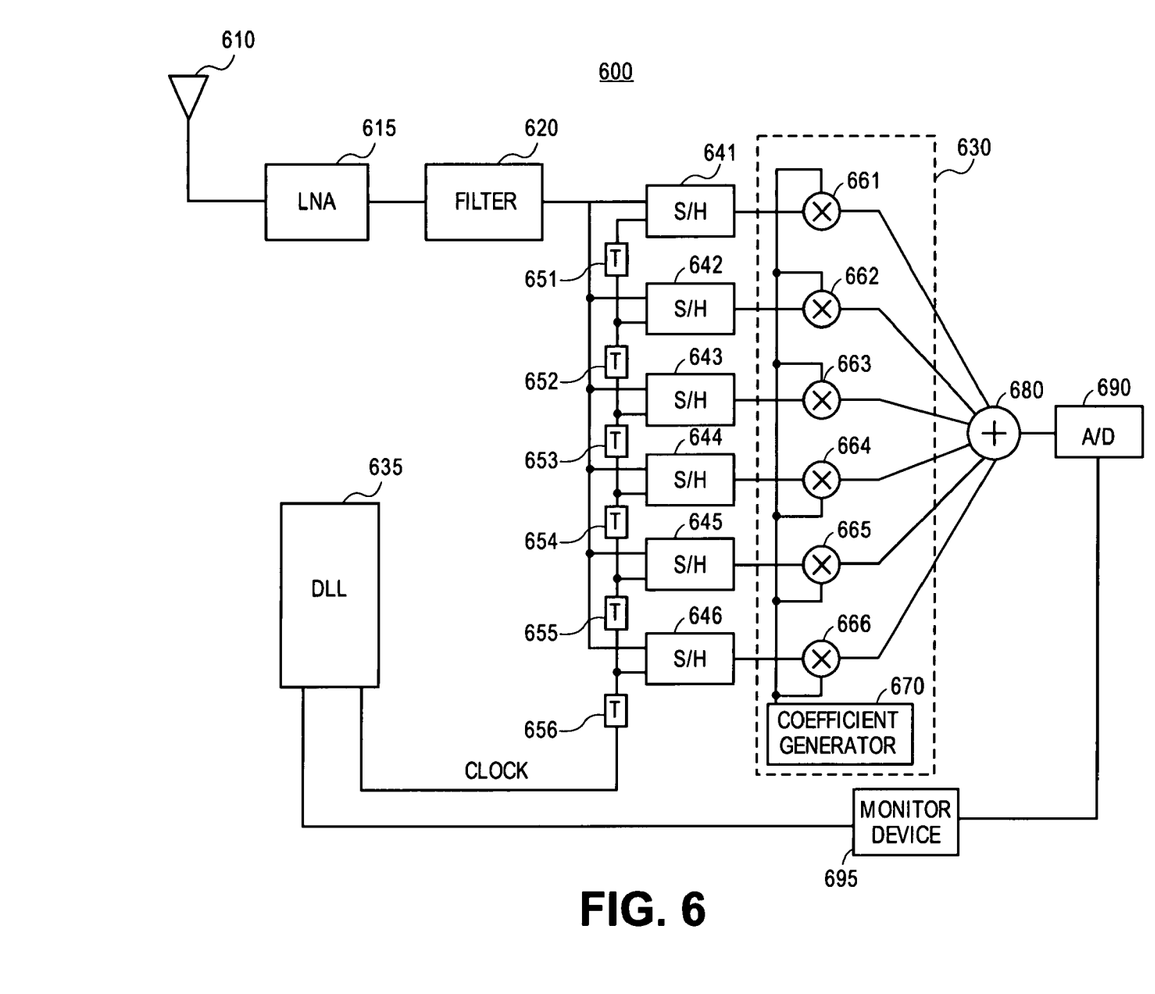
FIG. 6 is a block diagram illustrating a receiver in accordance with an embodiment of the present invention.

Turning to FIG. 6, a receiver 600 in accordance with an embodiment of the present invention is described. Receiver 600 may be part of a transceiver of communication devices 510 or 520 (FIG. 5) or may be part of a stand-alone receiver. Receiver 600 may be a portion of an integrated circuit (IC) or may comprise more than one integrated circuit. Receiver 600 may be a UWB receiver and may be adapted to process (e.g., receive, detect and decode) UWB waveforms such as, for example, waveforms 100 or 300 (described with reference to FIGS. 1–4). In some embodiments, receiver 600 may be adapted to convert wideband RF signals into baseband signals. Receiver 600 may also be referred to as a baseband circuit.

Receiver 600 may be adapted to process wideband RF signals having bandwidth of at least about 500 MHz. Receiver 600 may include an antenna 610 to receive radiated wideband RF signals. Antenna 610 may comprise one or more antennas, and may be, for example, a dipole antenna, a monopole antenna, a loop antenna, or a microstrip antenna, although the scope of the present invention is not limited in this respect. Receiver 600 may further include a low-noise amplifier (LNA) 615 connected to antenna 610 to amplify the received wideband RF signals.

A filter 620 may be connected to LNA 615 Although the scope of the present invention is not limited in this respect, filter 620 may be a bandpass filter that may attenuate frequencies out of a desired passband. For example, filter 620 may have cutoff frequencies of about 300 MHz and about 10 GHz, so that frequencies of less than about 300 MHz and greater than about 15 GHz are attenuated. In one embodiment, filter 620 may have cutoff frequencies of about 3.1 GHz and about 10.6 GHz, so that frequencies of less than about 3.1 GHz and greater than about 10.6 GHz are attenuated.

Receiver 600 may include a number of sample-and-hold (S/H) devices 641–646 that may be connected in a parallel arrangement. In this embodiment, receiver 600 converts a wideband RF signal to a baseband signal using at least one sample-and-hold device (e.g., S/H device 646) to process the wideband RF signal. A delay docked loop (DLL) 635 may provide timing signals to S/H devices 641–646 via delay devices 651–656. The timing signals may serve as clock signals for S/H devices 641–646. Delay devices 651–656 may provide a delay (labeled T) so that each S/H device may sample the received wideband RF signal at different points in time. For example, DLL 635 may provide a signal labeled CLOCK to delay element 656 A rising edge of signal CLOCK may propagate up the delay chain formed by delay devices 651–656 and may sequentially trigger each S/H device. As an example, a rising edge of signal CLOCK may first trigger S/H device 646, then may trigger S/H device 645 followed by respectively triggering S/H devices 644–641. The next rising edge of signal CLOCK may occur after the last S/H device (e.g., S/H device 641) is triggered.

The parallel arrangement of S/H devices 641–646 may be referred to as a cascaded array of S/H devices and the operation of S/H devices 641–646 and delay devices 651–656 may be referred to as cascaded sampling.

S/H devices 641–646 may be adapted to sample a received wideband RF signal and generate a sample signal that is representative of the received wideband RF signal. In one embodiment, S/H devices 641–646 may sample a continuous-time wideband RF signal to generate a corresponding discrete-time sample signal. For example, S/H devices 641–646 may sample a received wideband RF signal having a duration of about 1 ns at different points in time, e.g, approximately every 160 picoseconds (ps) to generate discrete sample signals In this example, the sampling rate is 160 picoseconds and may be generated by delay devices 651–656 That is, delay devices 651–656 may each provide 160 ps of delay, which may also be referred to as a delay step. The sampling rate may also refer to the frequency at which a continuous-time waveform is sampled to obtain a corresponding discrete-time waveform. In the example where the received wideband RF signal is sampled about every 160 ps, the sampling rate may be said to be approximately 6.25 GHz. The sampling period or sample window may refer to the amount of time that the received wideband RF signal is sampled. For example, the sampling period in this example may be about 1 ns.

After the discrete sample signals are generated, these sample signals may be stored or held for a predetermined amount of time which may be referred to as the holding period. The discrete sample signals may be voltage levels stored on a capacitor or digital values stored in a register. S/H devices 641–646 may use a capacitive storage device to sample the received wideband RF signal and to store the sample signals. During sampling mode, S/H devices 641–646 may operate as an input voltage follower and may then generate and hold a sample signal by storing the voltage level of the input signal at the appropriate time S/H devices 641–646 may also be referred to as track-and-hold devices.

In some embodiments, multiple wideband RF signals, i e., a pulse train, may be processed. The pulse duration of the wideband RF signals may be about 1 ns, and the pulse-to-pulse interval may be about 1 microsecond (us). During sampling of the received wideband RF signals, a sample signal may be stored or held for a duration approximately equal to the pulse-to-pulse interval, i e., about 1 microsecond (us). During the 1 us holding period, the sample signal may be processed (e g, correlated with a template signal to generate a product value, integrating the product values, etc.). The holding period may be longer than the sampling period, and in this example, once the received wideband RF signal is sampled, the subsequent devices (e.g, multipliers, summing device, A/D converter, etc.) may operate at a relatively lower frequency than S/H devices 641–646.

Although receiver 600 is illustrated as having several separate functional elements, one or more of the functional elements may be combined and may be implemented by combinations of software configured elements such as, for example, processors including digital signal processors (DSPs) and microcontrollers.

The number of S/H devices may be varied and is not a limitation of the present invention. The number of S/H devices and the delay of delay devices 651–656 may be chosen to cover the sampling window. In one embodiment, at least two S/H devices may be used to sample the received wideband RF signal and generate at least two discrete sample signals. in other embodiments, more than two S/H devices may be used to over-sample the received wideband RF signal, although the scope of the present invention is not limited in this respect. In yet another embodiment, the sampling window may be about 1 ns and ten S/H devices and ten delay devices with a delay step of about 100 ps may be used to cover the sample window. In yet another embodiment, a cascaded array of ten S/H devices and ten delay devices may be used to sample an 8 GHz RF signal using a clock of about 1.6 GHz. In this embodiment, a 62.5 ps (16 GHz) sampling rate may be used to sample the 8 GHz RF signal. The 62.5 ps sampling rate may be implemented by setting the delay step of the ten delay devices to 62.5 ps. With a delay step of 62.5 ps, a cascaded array of ten S/H devices and ten delay devices may have an effective sampling rate of about 16 GHz from a clock of about 1.6 GHz.

In one embodiment, S/H device 646 may include circuitry to sample the received RF signal at a predetermined point in time, generate a discrete value (e.g., a voltage potential), and store the discrete value for a predetermined amount of time. S/H device 645 may include circuitry to sample the received RF signal at another predetermined point in time, generate another discrete value, and store this discrete value for a predetermined amount of time. Similarly, S/H devices 641–644 may include circuitry to sample the received RF signal at other predetermined points in time, generate other discrete values, and store these discrete values for a predetermined amount of time. A sample signal may be generated from the discrete values.

Figure 7:
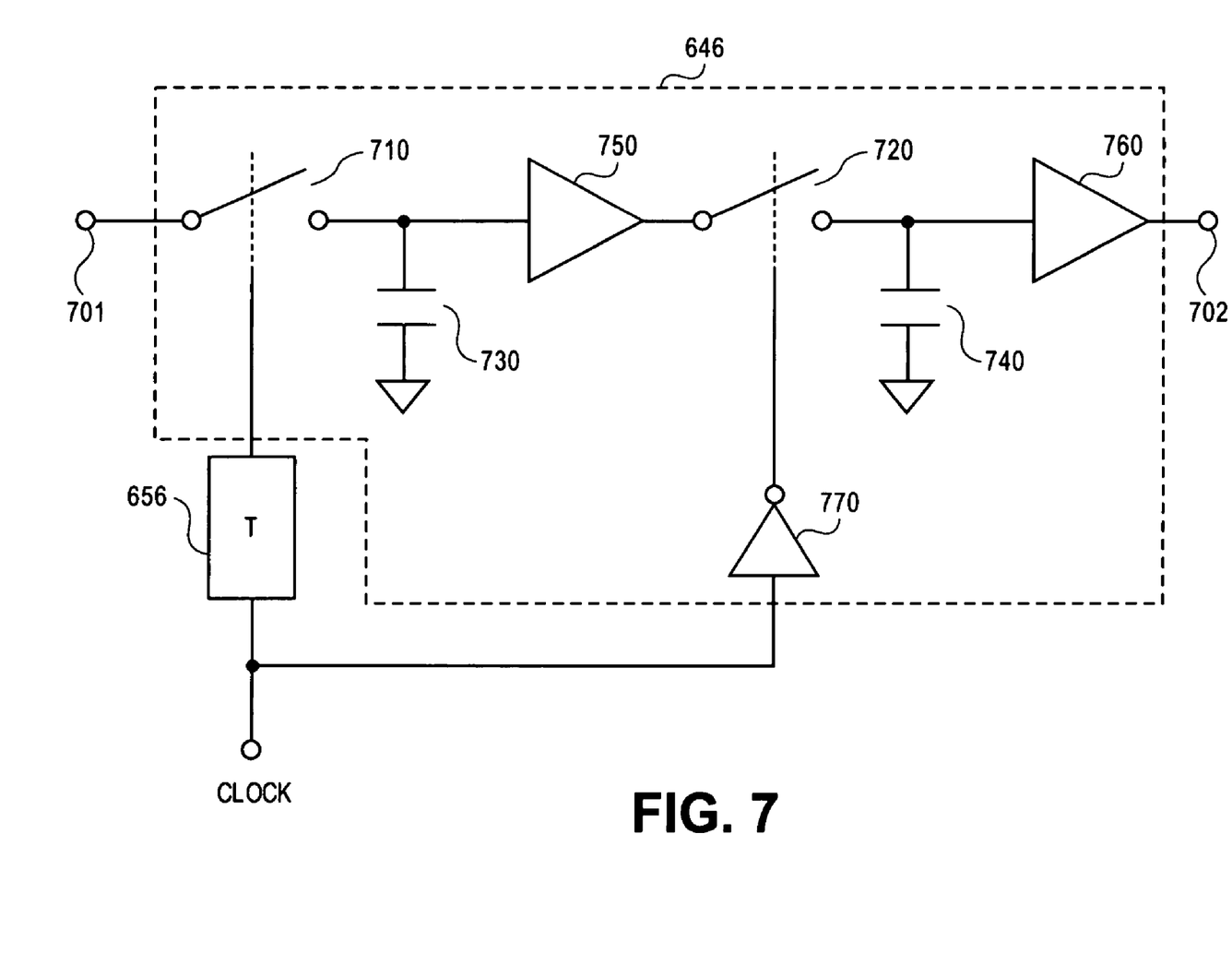
FIG. 7 is a schematic diagram illustrating a sample-and-hold circuit in accordance with an embodiment of the present invention.

Turning to FIG. 7, a schematic diagram Illustrating an embodiment of S/H device 646 (FIG. 6) is discussed. In this embodiment, S/H device 646 may be a two phase buffered S/H circuit. S/H device 646 may include switches 710 and 720, capacitors 730 and 740, amplifiers 750 and 760, and an inverter 770.

An RF signal may be received at input terminal 701 and a sample signal that corresponds to a portion of the received RF signal may be output at output terminal 702. Switches 710 and 720 may be controlled by signal CLOCK. As signal CLOCK transitions from a relatively low level to a relatively high level, i.e., a rising edge, switch 720 may open, and the sample signal generated from a previous sampling period is stored using capacitor 740. Amplifier 760 may operate as a buffer and may present the stored sample signal to output terminal 702. After a delay, switch 710 may be closed to allow capacitor 730 to operate as a voltage follower by tracking the input voltage of the received RF signal. With switch 710 closed and switch 720 open, S/H device 646 is tracking the input voltage at input terminal 701 and holding the previous sample at output terminal 702. The delay (T) of delay device 656 may be set to half the period of signal CLOCK so that switch 720 may be closed before switch 710 opens to preserve the sample stored using capacitor 740.

Amplifiers 750 and 760 may be unity gain microwave amplifiers. S/H device 646 may be manufactured using complementary metal-oxide semiconductor (CMOS) techniques, although the scope of the present invention is not limited in this respect.

Turning back to FIG. 6, receiver 600 may include a correlator 630 to detect the presence of an wideband RF signal. Generally, correlator 630 may correlate a received signal with a template signal that is representative of an expected signal. In the embodiment illustrated in FIG. 6, in order to detect the presence and phase of a received wideband RF signal, the sample signals that represent the received RF signal, and are stored in S/H devices 641–646, may be correlated, e.g, multiplied, by a template signal. In one embodiment, multipliers 661–666 may be respectively connected to S/H devices 641–646. The discrete sample values stored in S/H devices 641–646 may be multiplied by coefficient values that represent the template signal. The coefficient values may be generated by a coefficient generator 670. Multipliers 661–666 may generate products or output values from the multiplication, and may provide the product values to a summing device 680.

Summing device 680 may sum the product values from multipliers 661–666 and provide an output signal to analog-to-digital (A/D) converter 690. The output signal from summing device 680 may represent the result of the summing of the product values, which may be the correlated energy level generated during one sampling period. If the output signal from summing device 680 indicates a relatively high correlated energy level, this may indicate the presence of an wideband RF signal. Also, the correlated energy level may indicate the phase of the wideband RF signal so that one energy level may represent one digital value and another energy level may represent another digital value.

A/D converter 690 may be used to convert the output signal from summing device 680 to a digital value. For example, a modulation scheme may be employed that defines a logic "1" as two consecutive wideband RF signals of the same phase while a logic "0" may be defined as two consecutive wideband RF signals that are out of phase with respect to each other, although the scope of the present invention is not limited in this respect. Other modulation schemes may also be employed.

DLL 635 may be used to assist in detecting whether a wideband RF signal is received by receiver 600. DLL 635 may adjust the relative phase of S/H devices 641–646 until the sample signal is in phase with the template signal, e.g., the correlator coefficients. The correlated energy level of the output signal from summing device 680 may be increased by aligning the phase of the sample signal with the correlator coefficients. Monitor device 695 may monitor the correlated energy level processed by A/D converter 690 and may determine when the received wideband RF signal and the template signal are aligned. Monitor device 695 may transmit a control signal to DLL 635 to command DLL 635 to adjust the phase of S/H devices 641–646. In other embodiments, a phase locked loop (PLL) or other timing device may be used in place of DLL 635.

The time of arrival (referred to as a "time stamp") of wideband RF signals may also be determined using DLL 635. In one embodiment, a processor (not shown) may be adapted to process the time stamp information of multiple received wideband RF signals to determine distance information from a transmitting device or location information of the receiving device. For example, if three "time stamps" are determined, then the processor may determine the X, Y, and Z location of the transmitting device.

In one embodiment, DLL 635 may set the phase of signal CLOCK to a nominal value relative to a master clock (not shown). Monitor device 695 may then monitor the correlated energy level from summing device 680. If the correlated energy level is below a predetermined threshold, then the phase of signal CLOCK may be incremented or decremented by, for example, one delay step This process may be repeated until monitor device 695 determines that the correlated energy level is at about a maximum level and this may indicate that the received wideband RF signal and the template signal are aligned.

Integrators (not shown) may also be respectively connected between multipliers 661–666 and summing device 680 to integrate the correlated information over many received wideband RF signals. Detection may be improved by integrating several received wideband RF signals. For example, in a system where several wideband RF signals are transmitted to convey one bit of information, the repetitive received wideband RF signals may be integrated over several sampling periods to reduce any noise in the received signal, thereby improving the signal-to-noise (SNR) ratio.

The sample-and-hold, correlator multiplier, integrating, and summing functions described above with reference to FIG. 6 may be implemented using switched-capacitor techniques, although the scope of the present invention is not limited in this respect. For example, circuit 800 illustrated in FIG. 8 may be used to implement the sample-and-hold, correlator multiplier, and integrating functions described above with reference to FIG. 6. Circuit 900 illustrated in FIG. 9 may be used to implement the sample-and-hold, correlator multiplier, integrating, and summing functions described above with reference to FIG. 6.

Figure 8:
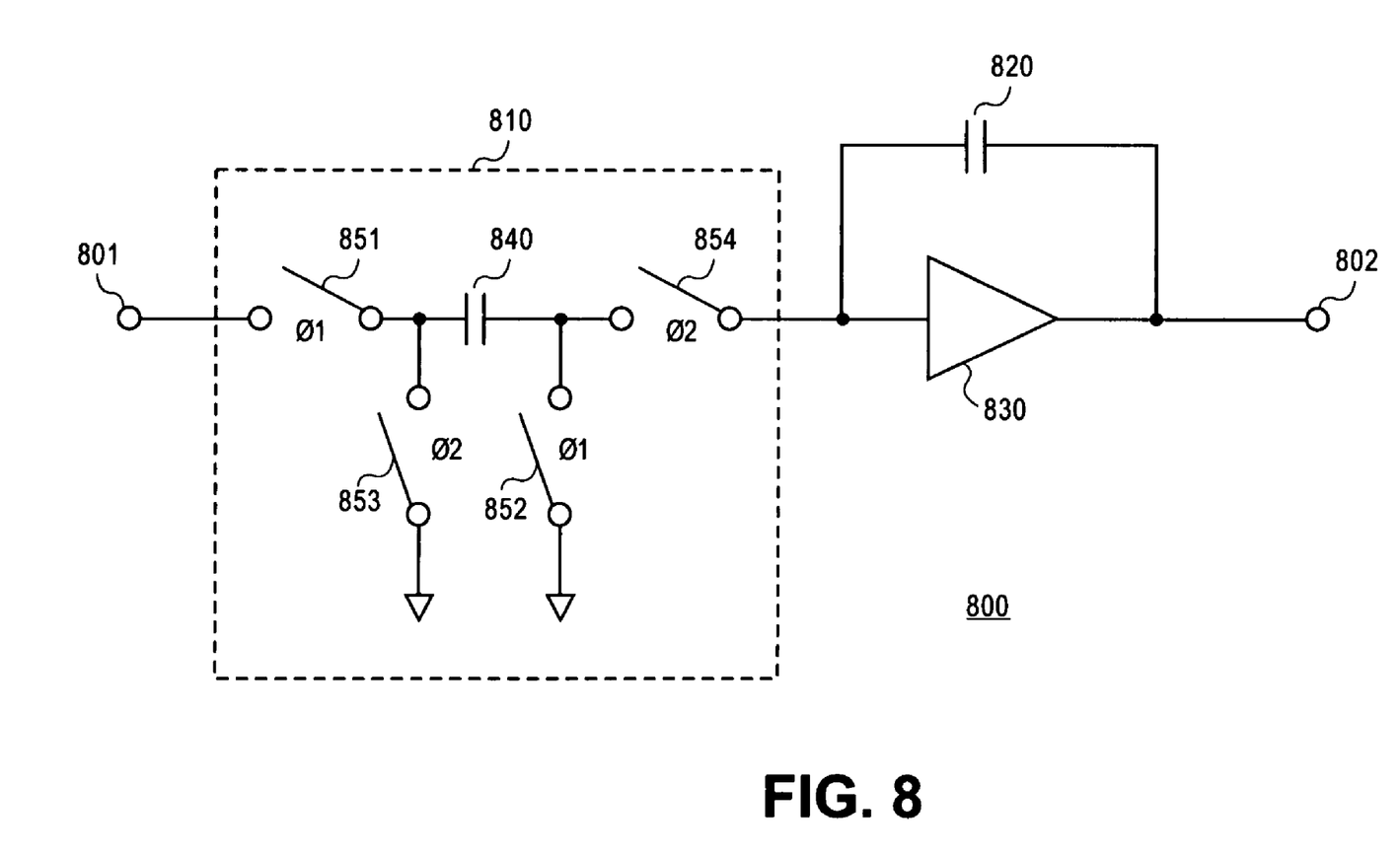
FIG. 8 is a schematic diagram illustrating a circuit in accordance with an embodiment of the present invention.

Turning to FIG. 8, circuit 800 may include a switched-capacitor resistor 810, a capacitor 820, and an amplifier 830. Switched-capacitor resistor 810 may include a capacitor 840 and switches 851–854. In one embodiment, during operation, a wideband RF signal may be received at terminal 801. The output voltage at terminal 802 may be proportional to the integration of the input voltage at terminal 801. Integration of the signals received at 801 may be achieved by charging feedback capacitor 820 by a current (I) that is proportional to the input voltage (Vin) and resistance (R) of input resistor 810, such that I=Vin/R. If resistor 810 is chosen so that 1/R is equivalent to a correlator coefficient, then the current that charges feedback capacitor 820 is proportional to the multiplication of the received signal at terminal 801 and the correlator coefficient. Since the current (I) charges capacitor 820 over time, the output voltage at terminal 802 may be the integration of the correlated signal.

As is illustrated in FIG. 8, resistor 810 is a switched-capacitor resistor. The capacitive value of capacitor 840 and the frequency of a clock signal used to open and close switches 851–854 may be used to determine the effective resistance of resistor 810. Switches 851 and 852 may be closed during one phase (Ø1) of the clock signal and switches 853 and 854 may be closed during another phase (Ø2) of the clock signal. Different correlator coefficients may be realized using different switch configurations. By changing the switch configuration and/or adding a switch, a negative correlator coefficient may be realized. Switched-capacitor circuit 800 may be referred to as a sampled correlator integrator.

Figure 9:
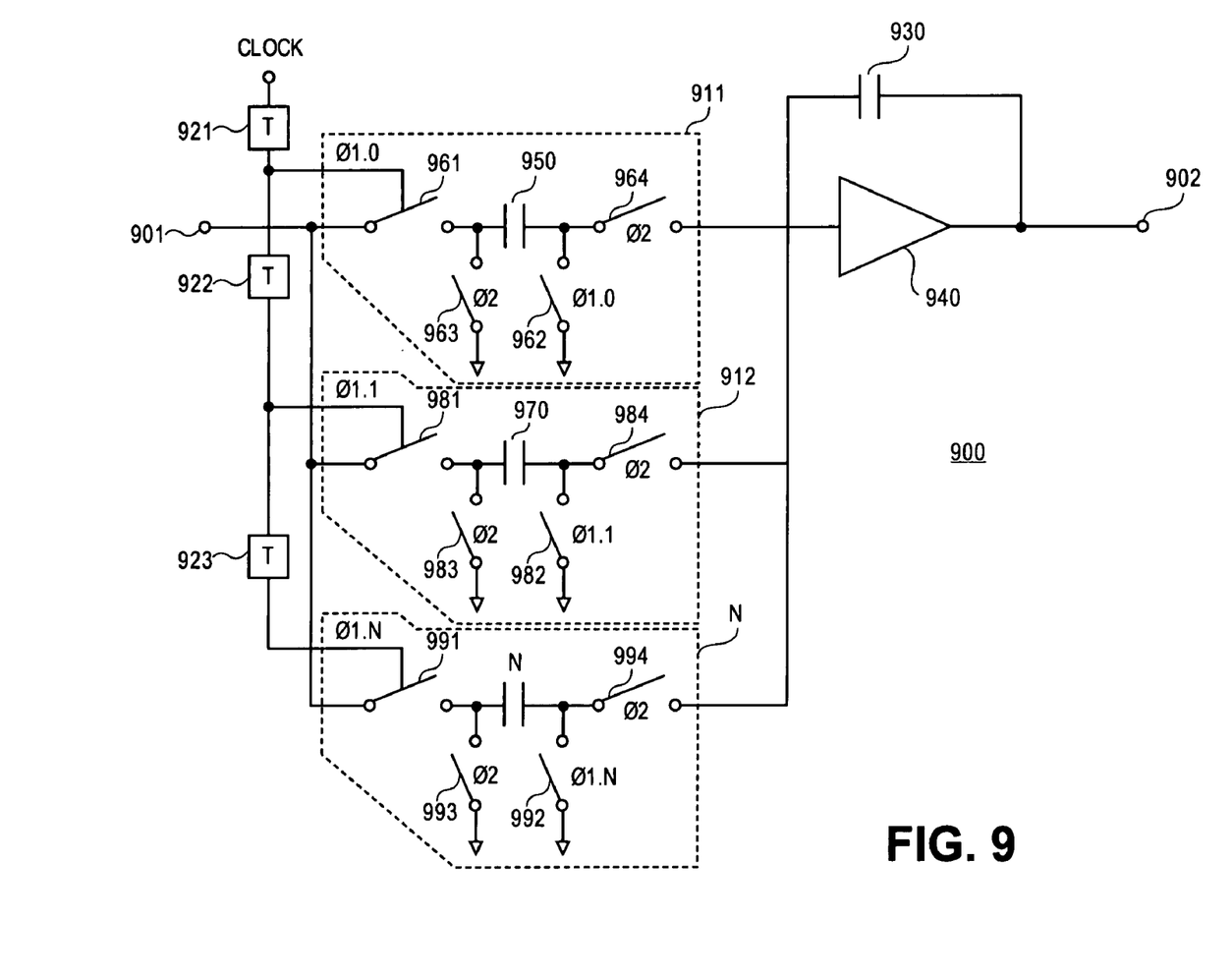
FIG. 9 is a schematic diagram illustrating another circuit in accordance with an embodiment of the present invention.

Turning to FIG. 9, circuit 900 is similar to circuit 800 of FIG. 8. Circuit 900 may include multiple switched-capacitor circuits (e.g., up to N switched-capacitor circuits) to implement a summation function along with the functions of sampling, correlating, and integrating that may be implemented using circuit 800 A wideband RF signal may be received at input terminal 901 and processed by circuit 900 to generate an output signal at output terminal 902.

Circuit 900 may include delay devices 921–923, switched-capacitor circuits 911, 912, and N, a capacitor 930, and an amplifier 940. Signal CLOCK may be a sample clock. Signal CLOCK and delay devices 921–923 may be used to control the opening and closing of switches 961–964, 981–984, and 991–994 to implement different correlator coefficients. Phase Ø2 may be a common clock for all samples. Phase Ø1.0 may be one delayed version of the sample CLOCK, phase Ø1.1 may be another delayed version of the sample CLOCK, and phase Ø1 N may be an Nth delayed version of the sample CLOCK.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method, comprising:
   sampling a radio frequency (RF) impulse signal to generate a sample signal; and
   storing the sample signal for a predetermined amount of time;
   wherein sampling occurs during a sampling period and wherein the predetermined amount of time is greater than the sampling period.

2. The method of claim 1, correlating the sample signal with a template signal to detect the presence and phase of the RF impulse signal, wherein the RF impulse signal is an ultrawideband (UWB) signal.

3. The method of claim 1, wherein the RF impulse signal is a continuous-time waveform and wherein sampling comprises:
   sampling the RF impulse signal at a first predetermined point in time to generate a first discrete value;
   sampling the RF impulse signal at a second predetermined point in time to generate a second discrete value; and
   generating the sample signal using the first discrete value and the second discrete value.

4. The method of claim 3, further comprising:
   multiplying the first discrete value by a first coefficient value to generate a first output value;
   multiplying the second discrete value by a second coefficient value to generate a second output value; and
   summing the first output value and the second output value to generate an output signal.

5. The method of claim 4, further comprising converting the output signal to a digital value.

6. A method, comprising: converting a pulsed radio frequency (RF) signal to a baseband signal, wherein converting includes using a first sample-and-hold device to process the pulsed RF signal;
   wherein converting further includes using a second sample-and-hold device to process the pulsed RF signal;
   wherein converting includes using the first sample-and-hold device to sample the pulsed RF signal and generate a sample signal and further including correlating the sample signal with a template signal to detect the presence the pulsed RF signal.

7. The method of claim 6, wherein the pulsed RF signal is an ultrawideband (UWB) signal.

8. An apparatus, comprising:
   a first sample-and-hold device adapted to process a radio frequency (RF) impulse signal;
   a second sample-and-hold device adapted to process the RF impulse signal, wherein the first sample-and-hold device and the second sample-and-hold device are connected in a parallel arrangement to process the RF impulse signal; and
   a delay locked loop (DLL); and a delay device coupled between the DLL and the first sample-and-hold device.

9. The apparatus claim 8, wherein the first sample-and-hold device is adapted to sample the RF impulse signal at a first predetermined point in time, generate a first discrete value, and store the first discrete value for a predetermined amount of time and wherein the second sample-and-hold device is adapted to sample the RF impulse signal at a second predetermined point in time, generate a second discrete value, and store the second discrete value for the predetermined amount of time.

10. The apparatus of claim 8, further comprising: a multiplier having an input terminal coupled to an output terminal of the sample-and-hold device.

11. The apparatus of claim 8, further comprising: a correlator having an input terminal coupled to an output terminal of the sample-and-hold device.

12. The apparatus of claim 11, further comprising a summing device having an input terminal coupled to an output terminal of the correlator.

13. The apparatus of claim 12, further comprising an analog-to-digital (A/D) converter having an input terminal coupled to an output terminal of the summing device.

14. The apparatus of claim 8, wherein the RF impulse signal is an ultrawideband (UWB) signal.

15. A system, comprising:
   a communication device adapted to wirelessly transfer information at a distance of less than about 10 meters, wherein the communication device comprises:
   a first sample-and-hold device adapted to process a radio frequency (RF) impulse signal; and a second sample-and-hold device adapted to process the RF impulse signal, wherein the first sample-and-hold device and the second sample-and-hold device are connected in a parallel arrangement to process the RF impulse signal;

wherein the communication device further includes an antenna having an output terminal coupled to an input terminal of the first sample-and-hold device, wherein the antenna is adapted to receive the RF impulse signal.

16. The system of claim 15, wherein the communication device further includes: a correlator having an input terminal coupled to an output terminal of the first sample-and-hold device.

17. The system of claim 15, wherein the RF impulse signal is an ultrawideband (UWB) signal.

* * * * *